(12) United States Patent
James-Roxby et al.

(10) Patent No.: US 7,133,978 B1
(45) Date of Patent: Nov. 7, 2006

(54) METHOD AND APPARATUS FOR PROCESSING DATA STORED IN A MEMORY SHARED AMONG A PLURALITY OF PROCESSORS

(75) Inventors: Philip B. James-Roxby, Longmont, CO (US); Charles A. Ross, Fort Collins, CO (US); Paul R. Schumacher, Rochester, MN (US)

(73) Assignee: Xilinx, Inc., San Jose, CA (US)

( * ) Notice: Subject to any disclaimer, the term of this patent is extended or adjusted under 35 U.S.C. 154(b) by 307 days.

(21) Appl. No.: 10/600,851

(22) Filed: Jun. 19, 2003

(51) Int. Cl.
*G06F 12/14* (2006.01)

(52) U.S. Cl. ...................................... 711/152; 711/164
(58) Field of Classification Search ................ 711/163, 711/151; 365/38
See application file for complete search history.

(56) References Cited

U.S. PATENT DOCUMENTS

| | | | | |
|---|---|---|---|---|
| 4,322,846 A | * | 3/1982 | Carroll et al. ................ 714/46 |
| 5,321,825 A | * | 6/1994 | Song ............................ 711/163 |
| 5,535,365 A | * | 7/1996 | Barriuso et al. ............. 711/155 |
| 5,678,026 A | * | 10/1997 | Vartti et al. .................. 711/152 |
| 6,243,793 B1 | * | 6/2001 | Aucsmith et al. ........... 711/151 |
| 6,573,748 B1 | * | 6/2003 | Trimberger ................... 326/38 |

FOREIGN PATENT DOCUMENTS

WO    WO 02/054250 A2  * 12/2000

* cited by examiner

*Primary Examiner*—Mano Padmanabhan
*Assistant Examiner*—Craig E Walter
(74) *Attorney, Agent, or Firm*—W. Eric Webostad; Robert Brush

(57) ABSTRACT

Method and apparatus for processing data stored in a memory shared among a plurality of processors is described. In an example, a semaphore is provided that is associated with a first portion of the memory. Tasks are stored in the first portion of the memory, the tasks being respectively related to data segments stored in a second portion of the memory. A state of the semaphore is determined. Access among the plurality of processors to the first portion of the memory is controlled in response to the state of the semaphore. A task is executed to process a data segment of the data segments in response to a processor of the plurality of processors gaining access to the first portion of the memory.

10 Claims, 4 Drawing Sheets

METHOD AND APPARATUS FOR PROCESSING DATA STORED IN A MEMORY SHARED AMONG A PLURALITY OF PROCESSORS

FIELD OF THE INVENTION

One or more aspects of the present invention relate generally to data processing systems and, more particularly, to processing data stored in a memory shared among a plurality of processors.

BACKGROUND OF THE INVENTION

In a data processing system, if more than one process or "thread" requires access to shared data, a synchronization mechanism is used to coordinate access to the shared data among different threads. The synchronization mechanism is necessary to prevent one thread from modifying the shared data before another thread has finished working with the shared data, such as a read-after write hazard among other types of shared data conditions to avoid. In some multi-threaded systems, a "task scheduling program" is used to control execution of the multiple threads and access to shared data among the multiple threads. A task scheduling program is typically executed by an operating system that runs on the data processing system.

Synchronization of shared data becomes more complex if multiple threads run on physically distinct processors in a multiprocessor system that accesses the shared data from a shared memory. For example, the processors may be executing threads independent from one another, such that each of the processors is unaware of the specific thread or threads being executed by the other processors. In addition, there may be no operating system present to control operation of the multiple processors. Since each of the processors is executing independent code, a task scheduler may not be extendable across all processor platforms. Without a task scheduler, such as a task scheduling program, the processors may interfere with one another while attempting to modify data stored in the shared memory.

Accordingly, it would be both desirable and useful to process data stored in a memory shared among a plurality of processors that execute independent threads.

SUMMARY OF THE INVENTION

An aspect of the invention is a method for processing data stored in a memory shared among a plurality of processors. In an embodiment, a semaphore is provided that is associated with a first portion of the memory. Tasks are stored in the first portion of the memory, the tasks being respectively related to data segments stored in a second portion of the memory. A state of the semaphore is determined. Access among the plurality of processors to the first portion of the memory is controlled in response to the state of the semaphore. A task is executed to process a data segment within the second portion of the memory in response to a processor of the plurality of processors gaining access to the first portion of the memory.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

Method and apparatus for processing data stored in a memory shared among a plurality of processors is described. One or more aspects in accordance with the invention are described in terms of multiple processors embedded within a programmable logic device (PLD), such as a field programmable gate array (FPGA). While specific reference is made to multiple processors embedded within a PLD, those skilled in the art will appreciate that one or more aspects of the invention may be used in other data processing systems having multiple processors accessing a shared memory, such as multiple processors embedded within an application specific integrated circuit (ASIC), application specific standard product (ASSP), or a plurality of discrete processors. In addition, the embedded processors may include a soft-core processor such as MicroBlaze™ Soft Processor from Xilinx Corporation of San Jose, Calif. or a hard-core processor such as IBM's PowerPC™ processor or a combination thereof.

Figure 1:
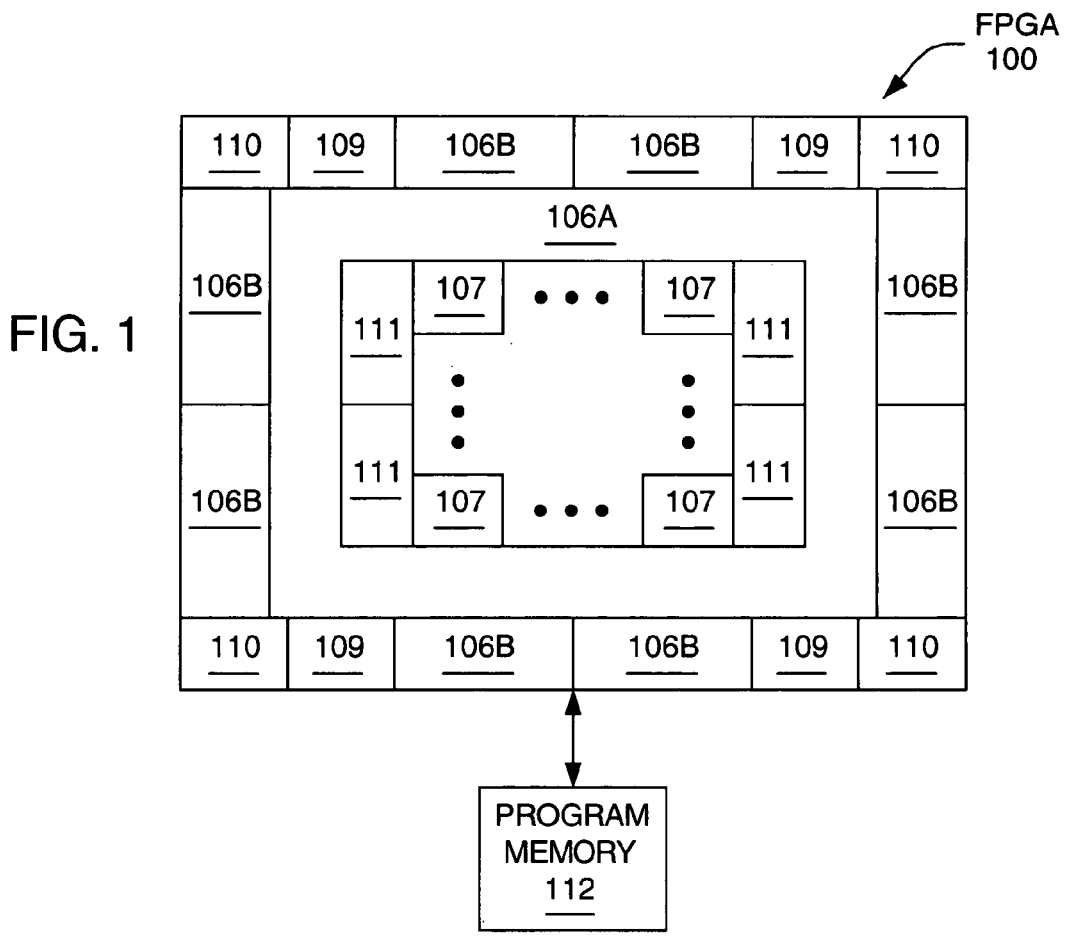
FIG. 1 is a block diagram depicting an exemplary embodiment of a field programmable gate array (FPGA) coupled to a program memory.

FIG. 1 depicts a block diagram of an exemplary embodiment of a field programmable gate array (FPGA) 100 coupled to a program memory 112. FPGA 100 illustratively includes CLBs 107, I/O routing ring 106A ("programmable interconnect"), memory 111, such as random access memory, delay lock loop (DLL) blocks 109, multiply/divide/de-skew clock circuits 110, and programmable IOBs 106B. DLL blocks 109 and clock circuits 110 collectively provide digital clock management (DCM) circuits for managing clock signals within FPGA 100. FPGA 100 may include other types of logic blocks and circuits in addition to those described herein.

CLBs 107 are programmably connectable to each other, and to I/O routing ring 106A, for performing various types of logic functions. Each of CLBs 107 may include one or more "slices" and programmable interconnect circuitry (not shown). Each CLB slice in turn includes various circuits, such as flip-flops, function generators (e.g., look-up tables (LUTs)), logic gates, memory, and like type well-known circuits.

Programmable IOBs 106B are configured to provide input to, and receive output from, one or more of CLBs 107. Configuration information for CLBs 107, I/O routing ring 106A, and programmable IOBs 106B is stored in memory 111. Briefly stated, a configuration bitstream produced from program memory 112 is coupled to a configuration port of FPGA 900 to implement a desired circuit therein. Each of CLBs 107, I/O routing ring 106A, and programmable IOBs 106B are generally referred to herein as "programmable logic blocks".

Figure 2:
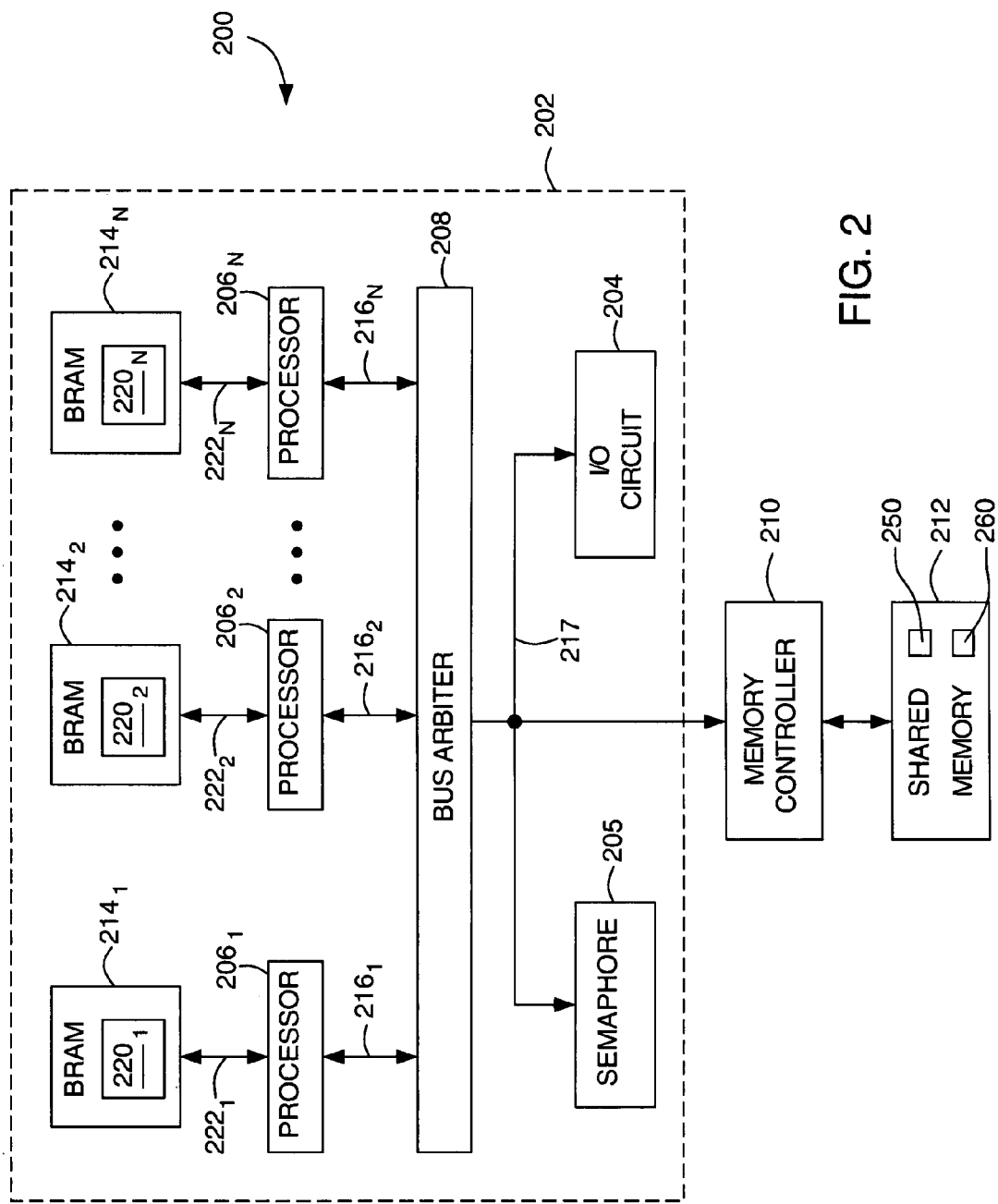
FIG. 2 is block diagram depicting an exemplary embodiment of a data processing system.

FIG. 2 is a block diagram depicting an exemplary embodiment of a data processing system 200. Data processing system 200 includes an FPGA 202, a memory controller 210, and a shared memory 212. FPGA 202 includes a plurality of processors $206_1$ through $206_N$ (collectively referred to as processors 206), memories $214_1$ through $214_N$ (collectively referred to as memories 214), a bus arbiter 208, a semaphore 205, and an input/output (I/O) circuit 204. Processors 206, through $206_N$ are coupled to bus arbiter 208 via respective busses $216_1$ through $216_N$ (collectively referred to as busses 216). Processors 206 communicate with a shared bus 217 through bus arbiter 208. In an embodiment, shared bus 217 is coupled to semaphore 205, memory controller 210, and I/O circuit 204.

Processors $206_1$ through $206_N$ are further coupled to respective memories $214_1$ through $214_N$ via respective busses $222_1$ through $222_N$ (collectively referred to as busses 222). Memories 214 may be static random access memory (SRAM), such as block RAM (BRAM) within FPGA 202, or other known types of memory. Memories $214_1$ through $214_N$ may be used to store respective program code $220_1$ through $220_N$. In an embodiment, each of processors $206_1$ through $206_N$ executes respective program code $220_1$ through $220_N$ independently from one another. That is, each of processors 206 executes a particular "thread" in data processing system 200. However, none of processors 206 is aware of the particular thread being executed by any other of the processors 206. In another embodiment there are a plurality of hard or soft core processors, which may or may not be part of a thread, but concurrently try to access and execute the same job.

In addition, various ones of processors 206 may be executing different program code than various others of processors 206. Though more than two processors 206, buses 222, and buses 216 are shown, it should be appreciated that FPGA 202 includes at least two processors 206, at least two buses 222, and at least two buses 216. As such N is an integer equal to or greater than two. In an embodiment, FPGA 202 may be considered as a system-on-a-chip (SoC), where processors 206 are embedded processor cores within FPGA 202. Alternatively, processors 206 may be "soft" processors formed by programming configurable logic blocks within FPGA 202.

Shared memory 212 comprises read/write memory. For example, shared memory 212 may be random access memory (RAM), such as synchronous-dynamic-RAM (SDRAM), including double-data-rate (DDR) SDRAM, Rambus-dynamic-RAM (RDRAM), and like types of RAM. Memory controller 210 controls access to shared memory 212 in a well-known manner. Although memory controller 210 and shared memory 212 are shown as discrete elements, those skilled in the art will appreciate that one or both of memory controller 210 and shared memory 212 may be embedded circuitry within FPGA 202. Furthermore, conventionally memory controller 210 and shared memory 212 are provided together as part of a memory module, such as a single-inline memory module (SIMM) or a dual-inline memory module (DIMM).

As described below, shared memory 212 stores shared data for use by processes executed by processors 206. Furthermore, information may be fetched, including pre-fetched, from bulk storage memory, such as a disc drive, into shared memory 212, where such information may be multiple segments in bulk storage, such as multiple blocks, but be stored as a single segment, such as continuous address space, in circuit memory. Notably, information may be received using I/O circuit 204, and stored within shared memory 212. For example, I/O circuit 204 may be a serial transceiver or a network interface.

Processors 206 communicate with bus arbiter 208, which controls access to devices on shared bus 217, such as shared memory 212. Notably, if multiple ones of processors 206 attempt to access a particular device on shared bus 217 at the same time, bus arbiter 208 executes an algorithm to determine which of processors 206 will obtain access to the particular device. Examples of arbitration algorithms include arbitrating based on fixed priorities assigned to processors 206 or arbitrating based on a round-robin priority assignment for processors 206, or other well-known arbitration algorithms, individually or in combination.

While bus arbiter 208 will prevent multiple ones or processors 206 from accessing a particular device on shared bus 217 simultaneously, bus arbiter 208 is not effective in preventing interference among processors 206 when non-unitary operations are performed over shared bus 217. For example, in some cases, processors 206 cannot read and write a value to shared memory 212 with a single instruction (i.e., atomically). For example, incrementing a value stored in shared memory 212 requires two instructions: a read instruction followed by a write instruction. As such, semaphore 205 is used to control access to particular portion(s) of shared memory 217 among processors 206.

Notably, as described below, shared memory 212 stores a list of tasks or "jobs" to be performed by processors 206, along with the data required to perform the jobs. In an embodiment, shared memory 212 stores a list of tasks ("job pool" 250) and data associated with each of the tasks ("job data" 260). Job data 260 comprises segments of data corresponding to particular jobs within job pool 250. Processors 206 access shared memory 212 to receive a job from job pool 250. If a processor $206_X$ receives a particular job, processor $206_X$ accesses the particular segment of data within job data 260 that is associated with the particular job. Since job pool 250 determines which job is to be executed next, multiple ones of processors 206 may be attempting to non-unitarily read from, and write to, job pool 250 simultaneously. As such, semaphore 205 controls access to job pool 250 among processors 206. Access control to job data 260 is not required, since once a specific one of processors 206 has been assigned a particular job, it is the only one of processors 206 that will be accessing the particular segment of data within job data 260 that is associated with that particular job.

In particular, semaphore 205 indicates whether job pool 250 is locked or unlocked. In an embodiment, a value of '0' stored within semaphore 205 indicates that job pool 250 is locked and only accessible by a respective one of processors 206 that obtained such a lock. Conversely, a value of '1' stored within semaphore 205 indicates that job pool 250 is unlocked, and thus is available to be locked for access by any one of processors 206. For clarity, locking of a single job pool 250 is described. It is to be understood, however, that multiple job pools or address space ranges may be locked out by semaphore 205. Processors 206 send read and write instructions to semaphore 205 via shared bus 217. Processors 206 send read instructions to semaphore 205 to lock job pool 250 for access. To unlock job pool 205, processors 206 send write instructions to semaphore 205.

For example, let there be two tasks or jobs, i.e., J1 and J2, in the job pool where J1 uses a first portion M1 of the shared memory and J2 uses a second portion M2 of the shared memory. Let M1 and M2 of the shared memory be mutually exclusive. M1 and M2 may also include predetermined data, i.e., associated job data for performing the job. If there are two processors P1 and P2 which both desire to execute a job, then the processor, e.g., P1, which gets the semaphore first accesses the job pool and is assigned job J1. P1 can then release the semaphore and execute J1. Next, P2 can access the job pool and get assigned J2. Since J2 has a non-overlapping address space in the shared memory, it can be executed on P2 concurrently with J1 on P1. If J1 and J2 only read from the shared memory then M1 and M2 may overlap. In an alternative embodiment, if J1 and J2 read from and/or write to one or more of the same memory locations, e.g., M1 and M2 overlap, then either the jobs are scheduled in the job pool so as to not conflict or a conventional conflict resolution system known to one of ordinary skill in the art may be added to resolve the conflicts.

Figure 3:
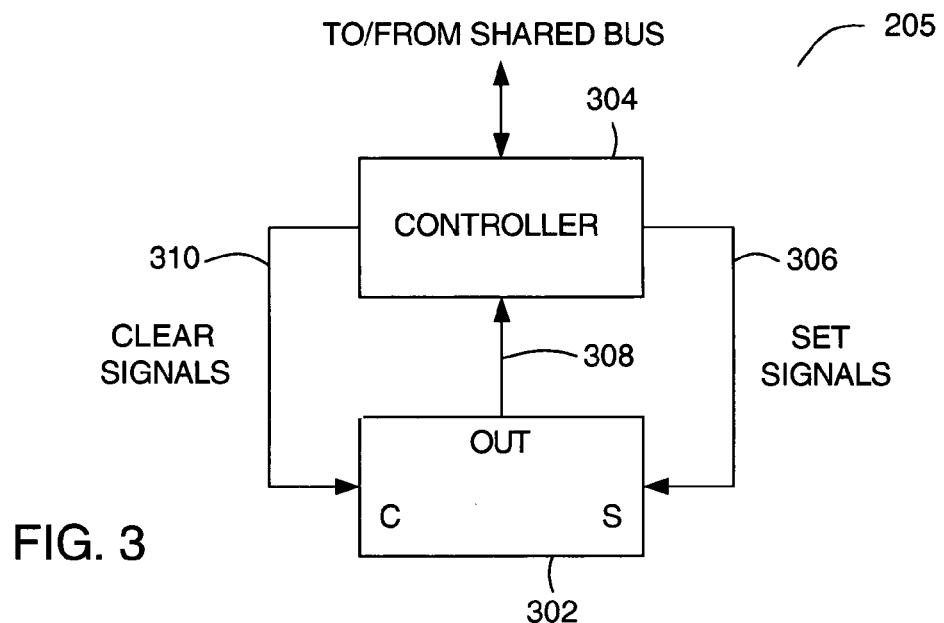
FIG. 3 is a block diagram depicting an exemplary embodiment of semaphore.

Semaphore 205 is formed by programming configurable logic blocks within FPGA 202 or by providing dedicated-embedded circuitry within FPGA 202 or a combination of both. FIG. 3 is a block diagram depicting an exemplary embodiment of semaphore 205. Semaphore 205 includes a register 302 and a control circuit ("controller" 304). Register 302 includes a set terminal 306, a clear terminal 310, and an output terminal 308. Set terminal 306, clear terminal 310, and output terminal 308 are coupled to controller 304. Controller receives input data from, and provides output data to, processors 206 via shared bus 217.

Operation of semaphore 205 is now described with reference to processor $206_X$ that may have access to data stored within shared memory 212 ("shared data") that is associated with semaphore 205. Processor $206_X$ sends a read instruction to control circuit 304 to determine whether the shared data is unlocked. Controller analyzes output of register 302 via output terminal 308. If register 302 is clear (i.e., the output value of register is '0'), then the shared data associated with semaphore 205 is locked. If register 302 is set (i.e., the output value of register 302 is '1'), then the shared data associated with semaphore 205 is unlocked. If controller 304 determines that the shared data segment is unlocked, controller 304 clears register 302 using a clear signal on clear terminal 310. Controller 304 then returns a '1' to processor $206_X$, indicating that the shared data is available to processor $206_X$ and has been locked to all other processors, i.e., processor $206_X$ has been given the semaphore.

Processor $206_X$ may now update the shared data as necessary. While processor $206_X$ has access to the shared data, other ones of processors 206, namely, at least one other processor 206 other than processor $206_X$ may be sending a read signal to semaphore 205. If controller 304 determines that the shared data is locked, controller 304 returns a '0' to other processor(s) 206, indicating that the shared data has already been locked by processors $206_X$. When processor $206_X$ is finished with the shared data, processor $206_X$ sends a write instruction to controller 304 to unlock the share data. Controller 304 in turn sends a set signal to register 302 over set terminal 306 to set register 302 (i.e., set the value of register 302 to '1').

Figure 4:
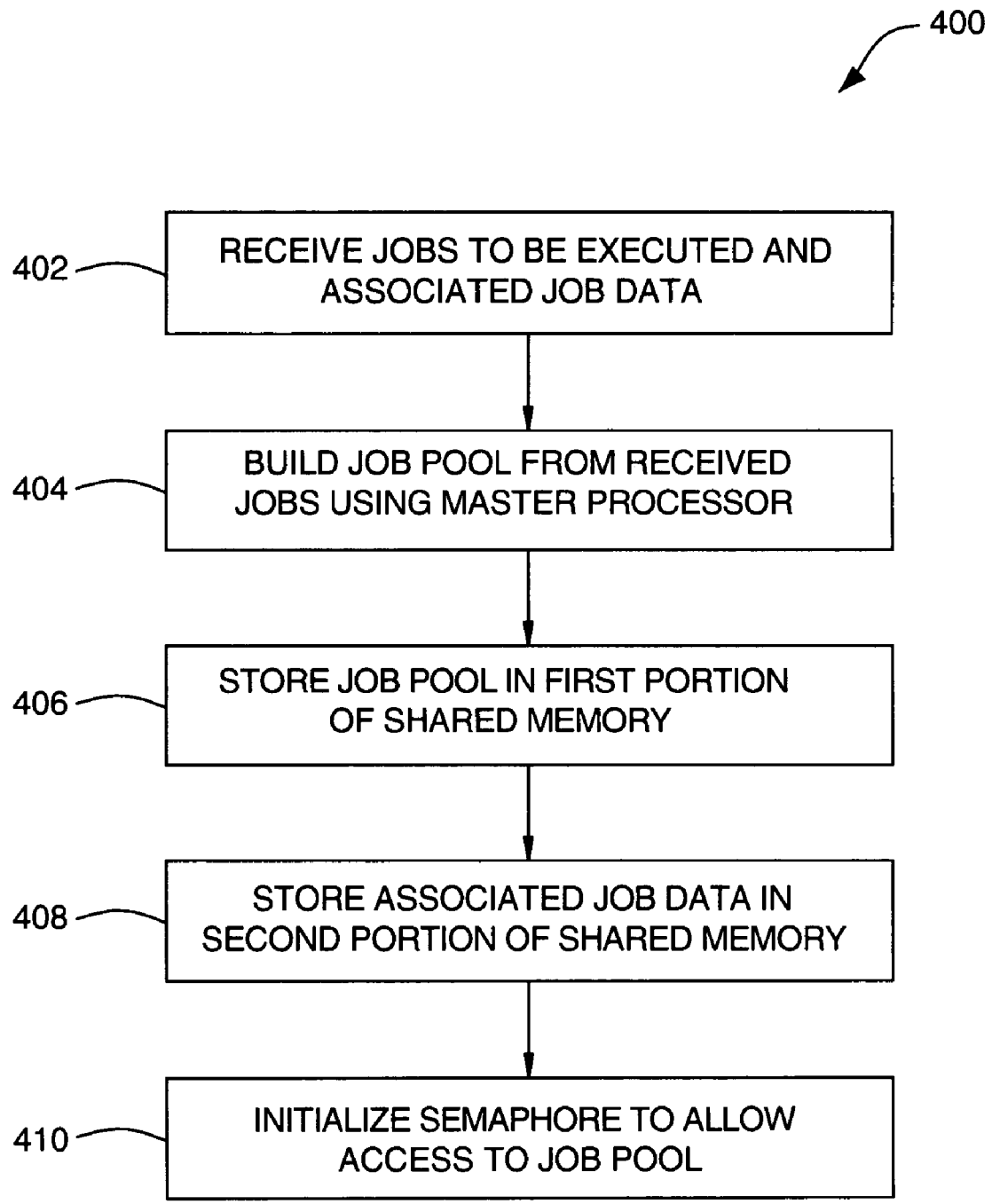
FIG. 4 is a flow diagram depicting an exemplary embodiment of a process for initializing a job pool for execution by multiple processors.

FIG. 4 is a flow diagram depicting an exemplary embodiment of a process 400 for initializing a job pool for execution by multiple processors. Process 400 begins at step 402, where jobs to be executed and associated job data is received. At step 404, a job pool is generated from the received jobs using a master processor of the processors. At step 406, the job pool is stored in a first portion of a shared memory coupled to the multiple processors. The job pool is stored in a location within the shared memory known by all the processors. In an embodiment, the job pool includes information as to: The number of jobs present; the next unfinished job (initialized to zero); the number of processors that have finished and are now idle (also initialized to zero); and an array of actual jobs to be executed. In another embodiment, multiple job pools may be formed using the received jobs. As such, the job pool may also include an identifier as to which of the multiple job pools are currently active.

Each job in the job pool contains information needed to complete that particular job, as well other information about the job pool itself. In an embodiment, each job includes information as to: The processor ID of the processor that completed the job; a job-type identifier; an address to dereference in order to find the segment of associated job data or a base address of an associated address space for performing the job; a value to signify the length of the segment of associated job data or size of the associated address space. Storing the processor ID of the processor that completed the job is useful for determining how well the load is balanced among the multiple processors, and may be used to aid in debugging and performance analysis. Storing a job-type identifier allows for multiple types of jobs.

At step 408, the associated job data is stored in a second portion of the shared memory. The second portion of the memory may also include the associated address space for performing the job. At step 410, a semaphore for controlling access to the job pool is initialized to allow access to the job pool among the various processors.

Figure 5:
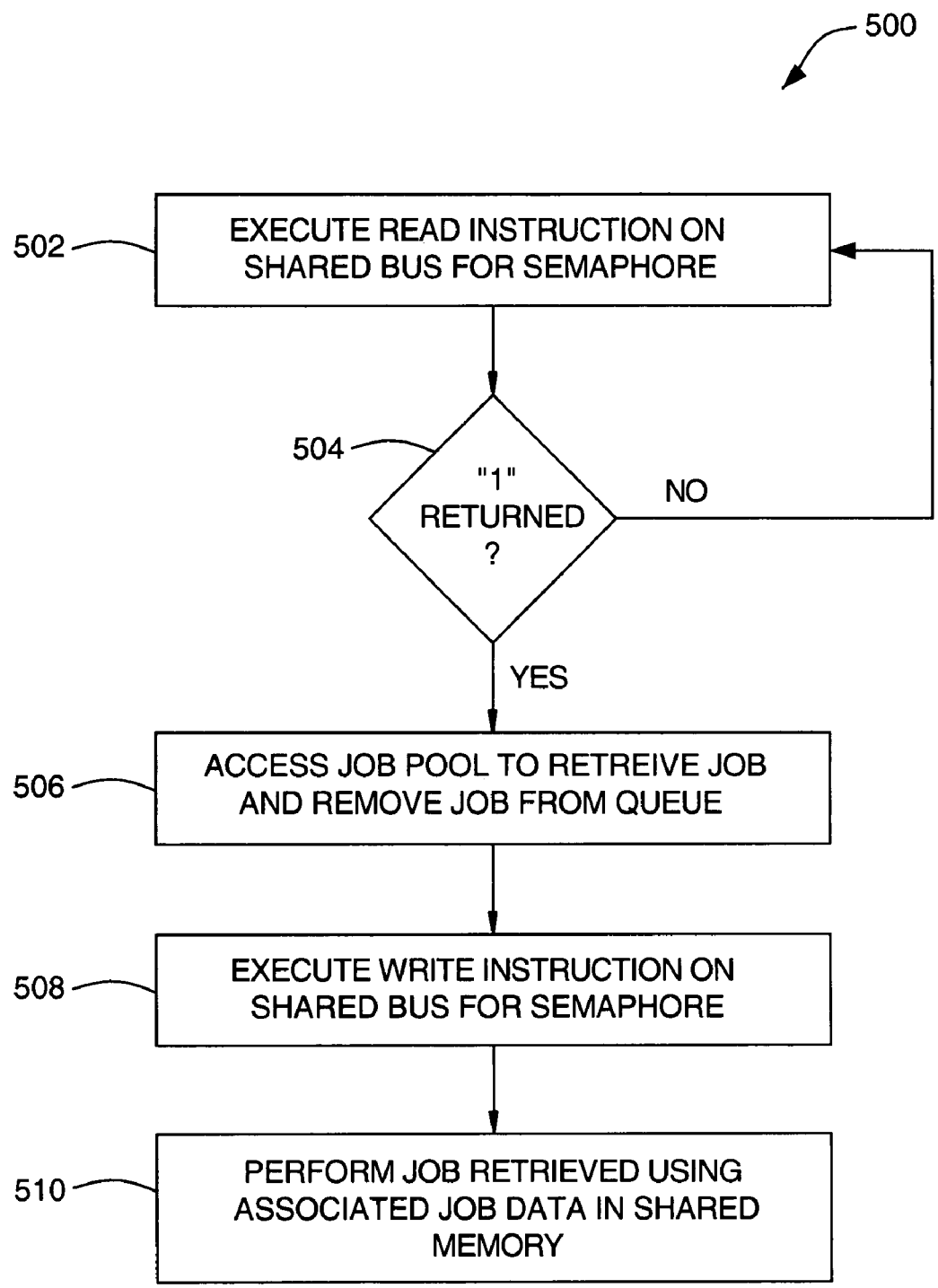
FIG. 5 is a flow diagram depicting an exemplary embodiment of a process for accessing and performing jobs among multiple processors.

FIG. 5 is a flow diagram depicting an exemplary embodiment of a process 500 for accessing and performing jobs among multiple processors. Process 500 begins at step 502, where a particular processor executes a read instruction on a shared bus for a semaphore that controls access to a job pool. At step 504, the processor determines if the job pool is currently locked by the semaphore. If the job pool is locked, the semaphore returns a '0' and process 500 returns to step 502. If the job pool is unlocked, the semaphore returns a '1' and process 500 proceeds to step 506.

At step 506, a processor gaining access to a job pool retrieves a job and removes the job from the job pool. At step 508, the processor executes a write instruction on a shared bus for a semaphore. As described above, a write instruction clears the semaphore so that the job pool becomes unlocked. At step 510, the processor that retrieved the job from the job pool performs the retrieved job using the associated job data stored in the shared memory and may also use the associated address space.

While the foregoing describes exemplary embodiment(s) in accordance with one or more aspects of the present invention, other and further embodiment(s) in accordance with the one or more aspects of the present invention may be devised without departing from the scope thereof, which is determined by the claim(s) that follow and equivalents thereof. Claim(s) listing steps do not imply any order of the steps. Trademarks are the property of their respective owners.

The invention claimed is:

1. A method for processing data stored in a memory shared among a plurality of processors, comprising:
   providing a semaphore associated with a first portion of the memory;
   storing tasks in the first portion of the memory, the tasks respectively related to information associated with a second portion of the memory;
   determining a state of the semaphore;
   controlling access among the plurality of processors to the first portion of the memory in response to the state of the semaphore; and executing a task to process at least some of the information within the second portion of the memory in response to a processor of the plurality of processors gaining access to the first portion of the memory;

providing another memory respectively coupled to each of the plurality of processors; and storing a program in the other memory accessible by each of the plurality of processors, the program capable of executing at least one of the tasks.

2. The method of claim 1, wherein the controlling comprises:

allowing one of the plurality of processors to access the first portion of the memory responsive to the semaphore having a first state value; and blocking access to all of the plurality of processors to the first portion of the memory responsive to the semaphore having a second state value.

3. The method of claim 1, further comprising coupling the semaphore to a bus shared by each of the plurality of processors.

4. The method of claim 1, wherein the storing comprises:

initializing state of the semaphore to allow access to the first portion of the memory; and receiving tasks to be executed by the processor of the plurality of processors.

5. A method for processing data stored in a memory shared among a plurality of processors, comprising:

storing task data for one or more tasks;

relating each of the one or more tasks to respective one or more data segments stored in a second portion of the memory;

associating a semaphore with the task data;

controlling access among the plurality of processors to the task data in response to a state of the semaphore; and executing a task of the one or more tasks to process a respective data segment in response to a processor of the plurality of processors gaining access to the task data;

providing another memory respectively coupled to each of the plurality of processors; and storing a program in the other memory of each of the plurality of processors, the program capable of executing the task of the one or more tasks.

6. The method of claim 5, wherein the controlling comprises:

allowing one of the plurality of processors to access the task data responsive to the semaphore having a first state value; and blocking access to all of the plurality of processors to the task data responsive to the semaphore having a second state value.

7. The method of claim 5, wherein the task data comprises a current task of the one or more tasks, a next task to be executed immediately following the current task, and a number of idle processors of the plurality of processors.

8. The method of claim 5, further comprising storing an identifier for the processor that executed the task.

9. The method of claim 5, wherein each of the one or more tasks is related to an identifier indicative of task-type.

10. The method of claim 5, wherein the relating comprises:

storing a respective address of the data segment within the second portion of the memory for each of the one or more tasks; and storing a length of the data segment respectively associated with each of the one or more tasks.

* * * * *